United States Patent
Kianush et al.

(10) Patent No.: US 6,738,606 B1
(45) Date of Patent: May 18, 2004

(54) FM RECEIVER WITH BANDWIDTH CONTROL MEANS

(75) Inventors: Kaveh Kianush, Eindhoven (NL); Jacobus Cornelis Sandee, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 579 days.

(21) Appl. No.: 09/593,836

(22) Filed: Jun. 14, 2000

(30) Foreign Application Priority Data

Jun. 16, 1999 (EP) .............................. 99201919

(51) Int. Cl.⁷ .............................. H04B 1/10; H04B 1/06; H04B 1/18
(52) U.S. Cl. ...................... 455/254; 455/296; 455/188.1
(58) Field of Search ............................. 455/254, 188.1, 455/266, 190.1, 296, 307, 339, 340

(56) References Cited

U.S. PATENT DOCUMENTS

| | | | |
|---|---|---|---|
| 5,095,534 A | | 3/1992 | Hiyama ..................... 455/266 |
| 5,564,093 A | * | 10/1996 | Matsumoto ................ 455/266 |
| 5,691,666 A | * | 11/1997 | Owen ........................ 329/319 |
| 5,745,856 A | * | 4/1998 | Dent .......................... 455/552 |
| 5,963,851 A | * | 10/1999 | Blanco et al. .............. 455/75 |
| 6,178,314 B1 | * | 1/2001 | Whikehart et al. ...... 455/188.1 |

FOREIGN PATENT DOCUMENTS

EP 0939496 A1 9/1999 ............ H04B/1/10

* cited by examiner

*Primary Examiner*—Nay Maung
*Assistant Examiner*—Alan T. Gantt
(74) *Attorney, Agent, or Firm*—Steven R. Biren

(57) ABSTRACT

An FM receiver includes control means for controlling the IF filter. The control means receive a first input signal in dependence of a received RF level signal and a second input signal in dependence of a demodulated signal and have an output coupled to the controllable IF filter.

6 Claims, 2 Drawing Sheets

| | S±100 | S±200 | THD Δf=75kHz | | THD Δf=120kHz | |
|---|---|---|---|---|---|---|
| | | | Vrf=100μV | Vrf=1mV | Vrf=100μV | Vrf=1mV |
| TEA6850 | 34dB | 70dB | 1.3% | 0.2% | 80% | 3.0% |
| INV | 34dB | 74dB | 0.2% | 0.2% | 0.4% | 0.4% |
| CER.FIL. | 11dB | 66dB | 0.5% | 0.5% | 1.9% | 1.9% |

| | | | THD Δf=75kHz | | THD Δf=120kHz | |
|---|---|---|---|---|---|---|
| | S±100 | S±200 | Vrf=100μV | Vrf=1mV | Vrf=100μV | Vrf=1mV |
| TEA6850 | 34dB | 70dB | 1.3% | 0.2% | 80% | 3.0% |
| INV | 34dB | 74dB | 0.2% | 0.2% | 0.4% | 0.4% |
| CER.FIL. | 11dB | 66dB | 0.5% | 0.5% | 1.9% | 1.9% |

US 6,738,606 B1

FM RECEIVER WITH BANDWIDTH CONTROL MEANS

BACKGROUND OF THE INVENTION

The invention relates to a FM receiver as described in the preamble of claim 1. The invention also relates to control means for use in such a FM receiver. The invention also relates to a method for controlling an IF.

FM receivers are known in the art. In the last decades, the number of FM transmitters worldwide has steadily increased. One consequence of this "squeezing" of more channels into the FM band has been an increased channel selectivity requirement for the (radio) FM receivers. To meet this requirement the filters in the FM receivers have to be made more selective.

An adaptive solution is to switch between two fixed filters with different bandwidths depending on some detection criterion. Switching between a number of fixed filters is quite costly, gives only discrete bandwidth solutions and still requires selected filters with respect to the respective center frequency.

A more elaborate solution is to incorporate channel filters with truly variable bandwidth. Such a system is known from the Philips integrated circuit TEA 6850 which uses integrated filters were the bandwidth is a function of the adjacent channel residue in the ultrasonic frequency range (this is above 100 kHz.).

Although this system is used in the market it has a number of limitations. The most important shortcoming of this system is that at low RF levels and large wanted frequency deviations, the channel filter goes into a so-called latch up mode with undesirable consequences. This is because, under the above signal conditions, high frequency distortion products are generated which are interpreted as adjacent channel signals. The control loop then reduces the IF filter bandwidth to counteract this apparent undesired signal, but in fact increases the unwanted distortion. This continues until the IF filter bandwidth is stuck in a minimum state.

SUMMARY OF THE INVENTION

It is an object of the invention to provide a FM receiver having a good dynamic selectivity and at the same time has a large frequency deviation tolerance.

A second object of the invention is to provide control means for use in a FM receiver.

A third object of the invention is to provide a method for controlling an IF filter.

An optimum instantaneous bandwidth can be defined by taking into account not only the adjacent channel but also the RF level and desired modulation as well.

Further not only the bandwidth can be controlled dynamically but also other attributes such as the decay response and allowability of break throughs.

A side advantage of this new bandwidth control is an improved FM receiver sensitivity.

A FM receiver of an embodiment can be used both for analog as well as digital implementation.

In accordance with an exemplary embodiment, an FM receiver comprises: an RF section; a tunable mixer stage that frequency converts a desired RF FM reception signal into an intermediate frequency (IF) signal; a controllable IF filter; an FM demodulator which demodulates the IF signal; and a control means to control a bandwidth of the controllable IF filter. The control means further comprises a first input that receives a first input signal in dependence of a received RF level signal; a second input that receives a second input signal in dependence of a demodulated signal; an output that is coupled to the controllable IF filter; and an offset detector that detects an offset in said demodulated signal.

Embodiments of the invention are described in the dependent claims.

By using both the dynamic selectivity means and the threshold extension means for obtaining a control signal to be supplied to the controllable IF filter the behavior of the FM receiver is further improved.

BRIEF DESCRIPTION OF THE DRAWING

The invention will be described by way of example and elucidated with reference to the figures. Herein shows:

FIG. 1 shows an example of a FM receiver FMR comprising a radio frequency (RF) antenna input RF1 for connecting an antenna ANT thereto, to which a RF input section RF for RF signal processing is coupled. The RF input section is coupled to a mixer stage MIX to which a tunable oscillation signal is supplied from a tuning oscillator TO for tuning to and frequency conversion of the desired RF FM reception signal to an intermediate frequency (IF) signal Sif. The mixer MIX is coupled to controllable IF filter means IFF, which filter means are controlled by control means CM for controlling the bandwidth of the filter. The control means receive two input signals, a first input signal Srf depending on the received RF signal level and a second input signal Smpx depending on a demodulated (audio) signal (demodulated in a demodulator DEM). The IF filter means IFF are coupled to the demodulator DEM for demodulating the IF signal. The demodulator is coupled via an amplifier AMP to a loudspeaker LS, for example.

FIG. 2 shows the control means CM2 in more detail. The control means receive a first input signal Srf2 and a second input signal Smpx2.

The first input of the control means is coupled to a RF level detector RFL2 that supplies as an output signal a measure of the field strength at the antenna input of the FM receiver of the desired signal. The output of the RF level detector is coupled to dynamic selectivity control means DSC2. The output signal of the RF level detector is also supplied to threshold extension means TE2.

The second input is coupled to an adjacent channel filter ACF2 which adjacent channel filter is coupled to an adjacent channel detector ACD2 which supplies at an output a measure of the adjacent channel signal. The adjacent channel detector is coupled with an output to the dynamic selectivity control means DSC2.

The second input of the control means is also coupled to a modulation detector MD2. The modulation detector is coupled with an output to the dynamic selectivity control means DSC2 and also to the threshold extension means TE2.

The second input of the control means can as is shown in this example also be coupled to an offset detector OD2 for detecting a frequency offset. This frequency offset is measured as a DC-voltage. The offset detector improves the possibilities to detect a neighbor channel signal. In case of very strong neighbor channels or no desired signals, the modulation detector MD2 can detect the neighbor channel as the wanted modulation. The offset detector, detecting this condition by a change in the demodulator DC output, is used to avoid incorrect bandwidth control.

The dynamic selectivity control means DSC2 supply an output signal to a loop filter LF2 which loop filter also receives a control signal from the dynamic selectivity control means DSC2. The loop filter is coupled to an adder ADD2 that receives at the other input the output signal of the threshold extension means TE2. The output signal of the adder is supplied to the IF filter IFF2 as output control signal SC2 of the control means CM2.

Figures 1, 3:
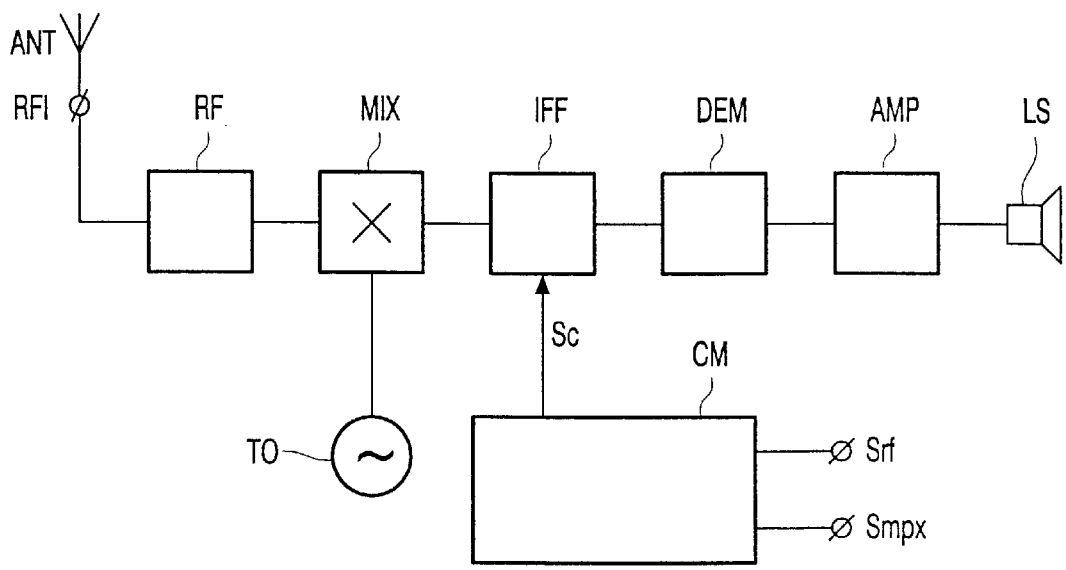
FIG. 1 schematically a FM receiver according to the invention.
FIG. 3 shows a table with a comparison between prior art solutions and the receiver according to the invention.
Figure 2:
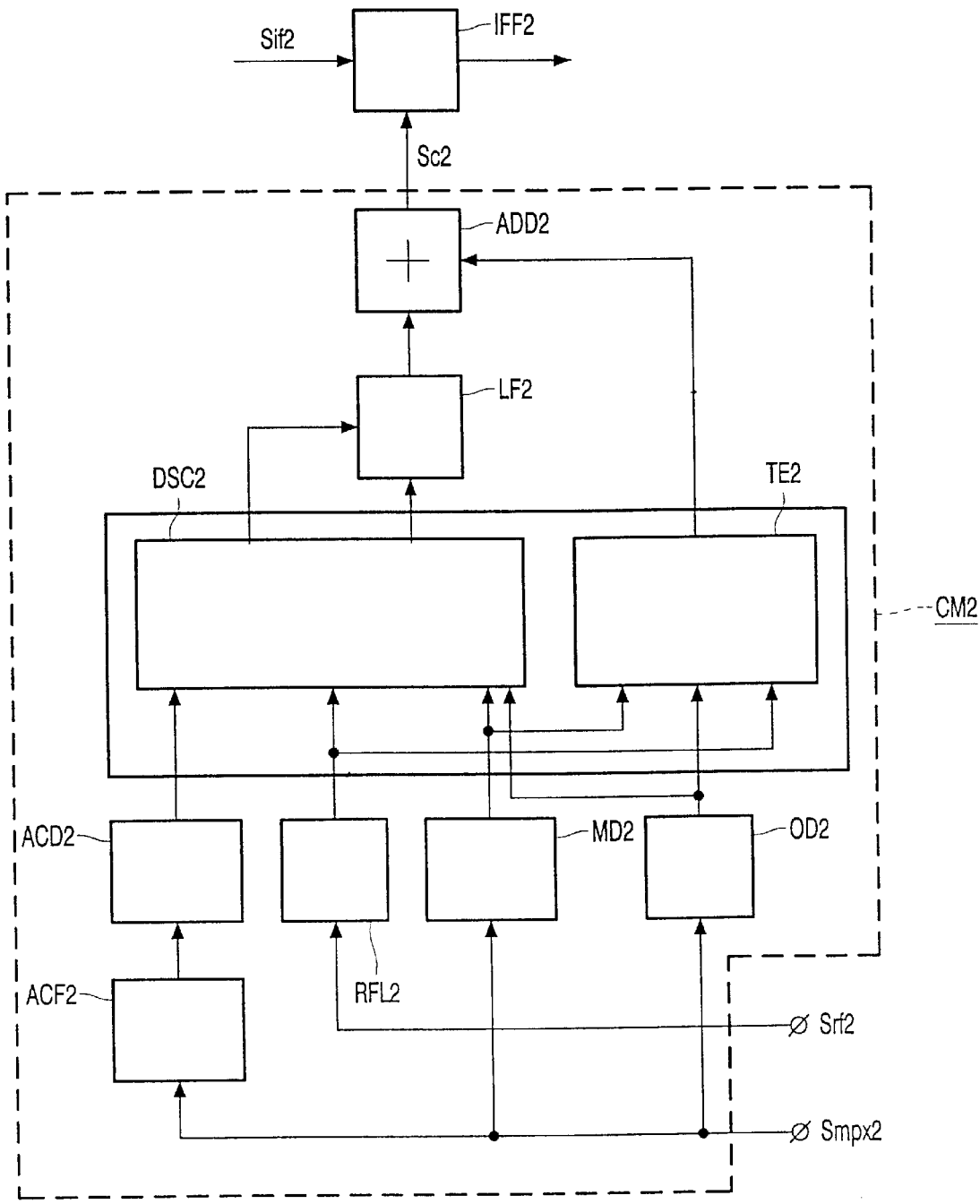
FIG. 2 the control means according to the invention in more detail.

FIG. 3 shows the differences between the prior art solution with the Philips IC TEA6850, the invention (INV) and a standard ceramic filter radio (CER. FIL.) on selectivity (S) at 100 kHz and 200 kHz and distortion (THD) at frequency deviations of 75 kHz and 120 kHz for RF input levels of 100 microvolt and 1 milli volt.

As can be seen from this table the selectivity (S) of the solution of the present invention is both better than the TEA6850 and ceramic filter solution. Further the measured distortion (THD) is also much better than the known solutions.

The invention has been described on the basis of an example. The man skilled in the art will be well aware of a lot of amendments falling within the scope of the invention.

To obtain the required selectivity the threshold extension means TE2 and the offset detector OD2 are not necessary. The threshold extension means improve the FM receiver sensitivity. The offset detector OD2 improves the FM receiver further by avoiding an incorrect bandwidth control in case of very strong neighbor channels or no desired signals.

Further it will be clear that the output signals of the dynamic selectivity control means DSC2 and of the threshold extension means can also first be added, if required using weighting factors and afterwards filtered in the loop filter LF2.

What is claimed is:

1. An FM receiver comprising:

an RF section;

a tunable mixer stage which frequency converts a desired RF FM reception signal into an intermediate frequency (IF) signal;

a controllable IF filter;

an FM demodulator which demodulates the IF signal; and a control means to control a bandwidth of the controllable IF filter, the control means further comprising:
   a first input that receives a first input signal in dependence of a received RF level signal; a second input that receives a second input signal in dependence of a demodulated signal; an output that is coupled to the controllable IF filter; and an offset detector that detects an offset in the demodulated signal.

2. An FM receiver as claimed in claim 1, characterized in that the control means comprises dynamic selectivity means coupled to the first and second input.

3. FM receiver as claimed in claim 2, characterized in that the control means comprises threshold extension means.

4. FM receiver as claimed in claim 3, characterized in that the control means further comprises an adjacent channel filter detector coupled with an input to the second input and with an output to the dynamic selectivity means.

5. FM receiver as claimed in claim 3, characterized in that the control means comprises a RF level detector between the first input and the dynamic selectivity means and the threshold extension means.

6. A method for controlling an IF filter of a FM receiver, the method comprising:

receiving a first input signal in dependence of a received RF level by the FM receiver;

receiving a second input signal in dependence of a demodulated signal; and providing a control means that supplies a control signal in dependence of the two input signals, wherein said control means further comprises an offset detector which detects an offset in the demodulated signal.

* * * * *